(12) United States Patent
Naka

(10) Patent No.: US 11,945,432 B2
(45) Date of Patent: Apr. 2, 2024

(54) DRIVING SUPPORT DEVICE FOR VEHICLE

(71) Applicant: SUBARU CORPORATION, Tokyo (JP)

(72) Inventor: Tatsushi Naka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 424 days.

(21) Appl. No.: 17/212,585

(22) Filed: Mar. 25, 2021

(65) Prior Publication Data

US 2021/0323542 A1 Oct. 21, 2021

(30) Foreign Application Priority Data

Apr. 15, 2020 (JP) ................................. 2020-073045

(51) Int. Cl.
*B60W 30/09* (2012.01)
*B60W 50/10* (2012.01)
*G06V 20/58* (2022.01)

(52) U.S. Cl.
CPC ............ *B60W 30/09* (2013.01); *B60W 50/10* (2013.01); *G06V 20/58* (2022.01); *B60W 2420/403* (2013.01); *B60W 2554/4049* (2020.02)

(58) Field of Classification Search
CPC ................. B60W 30/09; B60W 50/10; B60W 2420/403; B60W 2554/4049;

(Continued)

(56) References Cited

U.S. PATENT DOCUMENTS

| 2015/0307091 A1* | 10/2015 | Gokan .................... G01S 7/539 701/70 |
| 2019/0086917 A1* | 3/2019 | Okimoto ................ B60K 28/06 |
| 2021/0237719 A1 | 8/2021 | Chen et al. |

FOREIGN PATENT DOCUMENTS

| JP | 201429591 A * | 7/2012 | ............... G08G 1/16 |
| JP | 2014-029591 A | 2/2014 | |

(Continued)

OTHER PUBLICATIONS

Notice of Reasons for Refusal received in Japanese Patent Application No. 2020-073045, dated Oct. 24, 2023.

*Primary Examiner* — Russell Frejd
*Assistant Examiner* — Ana D Thomas
(74) *Attorney, Agent, or Firm* — Rimon P.C.

(57) ABSTRACT

A driving support device for a vehicle includes a vehicle-exterior environment recognizer, an erroneous-start suppression controller, and an erroneous-start-suppression-control canceler. The vehicle-exterior environment recognizer is configured to recognize exterior environment of the vehicle. The erroneous-start suppression controller is configured to execute, when an obstacle is present within a set distance in an axial direction of the vehicle and an accelerator operation for starting of the vehicle to move toward the obstacle is performed, erroneous-start suppression control that prevents the start of the vehicle. The erroneous-start-suppression-control canceler is configured to cancel the erroneous-start suppression control when a steering operation that is to enable avoidance of the obstacle is input and the accelerator operation is continuously performed at a set degree of opening of an accelerator or greater for a set time period during the erroneous-start suppression control.

5 Claims, 3 Drawing Sheets

(58) Field of Classification Search
CPC .............. B60W 30/143; G06V 20/58; B60K 2028/003; B60K 28/00
See application file for complete search history.

(56) References Cited

FOREIGN PATENT DOCUMENTS

| | | |
|---|---|---|
| JP | 2016-159761 A | 9/2016 |
| JP | 2019-143484 A | 8/2019 |

* cited by examiner

DRIVING SUPPORT DEVICE FOR VEHICLE

CROSS-REFERENCE TO RELATED APPLICATIONS

The present application claims priority from Japanese Patent Application No. 2020-073045 filed on Apr. 15, 2020, the entire contents of which are hereby incorporated by reference.

BACKGROUND

The disclosure relates to driving support devices that prevent vehicles from running in response to erroneous operation of accelerator pedals.

In recent years, there have been proposed technologies for performing various kinds of driving control on vehicles, such as automobiles. Such various kinds of driving control include causing the vehicle to follow or avoid a collision with a three-dimensional object, such as a vehicle ahead, recognized by a vehicle-exterior environment recognizer equipped with, for example, either one of a vehicle-exterior camera and a laser radar.

In a driving support device of this kind, erroneous-start suppression control for preventing an erroneous start of the vehicle in response to erroneous pressing of the accelerator pedal is known. With regard to this erroneous-start suppression control, a technology for preventing driver's unintended control intervention has been proposed. For example, Japanese Unexamined Patent Application Publication (JP-A) No. 2014-29591 discloses such a technology. Specifically, when a vehicle is waiting to make a right turn within an intersection, another oncoming vehicle waiting to make a right turn is regarded as being an obstacle, such that the torque does not increase even by pressing down on the accelerator pedal, thus resulting in a problem in which the vehicle cannot start moving smoothly. In order to cope with such a problem, an obstacle is regarded as being an obstacle for performing erroneous-start suppression control only when the obstacle exists in a traveling path predicted based on the steering angle.

SUMMARY

An aspect of the disclosure provides a driving support device for a vehicle. The driving support device includes a vehicle-exterior environment recognizer, an erroneous-start suppression controller, and an erroneous-start-suppression-control canceler. The vehicle-exterior environment recognizer is configured to recognize exterior environment of the vehicle. The erroneous-start suppression controller is configured to execute erroneous-start suppression control for preventing an erroneous start of the vehicle when an obstacle is present within a set distance in an axial direction of the vehicle and an accelerator operation that is to cause the vehicle to start moving toward the obstacle is performed. The erroneous-start-suppression-control canceler is configured to cancel the erroneous-start suppression control when a steering operation that is to enable avoidance of the obstacle is input and the accelerator operation is continuously performed at a set degree of opening of an accelerator or greater for a set time period during the erroneous-start suppression control.

An aspect of the disclosure provides a driving support device for a vehicle. The driving support device includes circuitry. The circuitry is configured to recognize exterior environment of the vehicle. The circuitry is configured to execute erroneous-start suppression control for preventing an erroneous start of the vehicle when an obstacle is present within a set distance in an axial direction of the vehicle and an accelerator operation that is to cause the vehicle to start moving toward the obstacle is performed. The circuitry is configured to cancel the erroneous-start suppression control when a steering operation that is to enable avoidance of the obstacle is input and the accelerator operation is continuously performed at a set degree of opening of an accelerator or greater for a set time period during the erroneous-start suppression control.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Since the technology disclosed in JP-A No. 2014-29591 is intended particularly for quickly entering an intersection, even when there is an obstacle in front of the vehicle, if the obstacle does not exist in the traveling path of the vehicle, the vehicle undesirably starts moving without undergoing erroneous-start suppression control. Therefore, for example, even when there is an obstacle, such as a wall, in front of the vehicle in a parked state, if the driver has coincidentally performed a predetermined steering operation that enables avoidance of contact with the obstacle, such as a case where the vehicle is parked in a steered state, the vehicle may start moving immediately without undergoing erroneous-start suppression control even if the operation for starting the vehicle performed by the driver is an erroneous operation, possibly causing the driver to panic.

It is desirable to provide a driving support device for a vehicle in which, if there is an obstacle within a set distance in the axial direction of the vehicle, the driving support device can cause the vehicle to start moving while allowing the driver to appropriately recognize the situation even when a collision with the obstacle is avoidable.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 3:
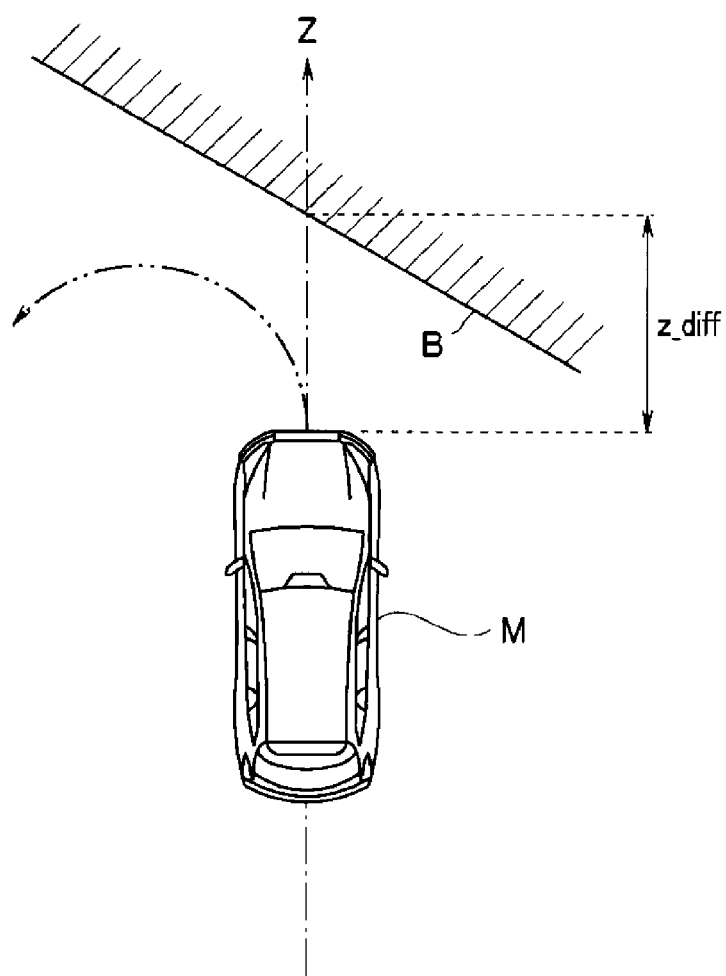
FIG. 3 illustrates an example of a case where erroneous-start suppression control is canceled against an obstacle located in front of a vehicle.

Reference sign M in FIG. 3 denotes a vehicle, such as an automobile.

Figure 1:
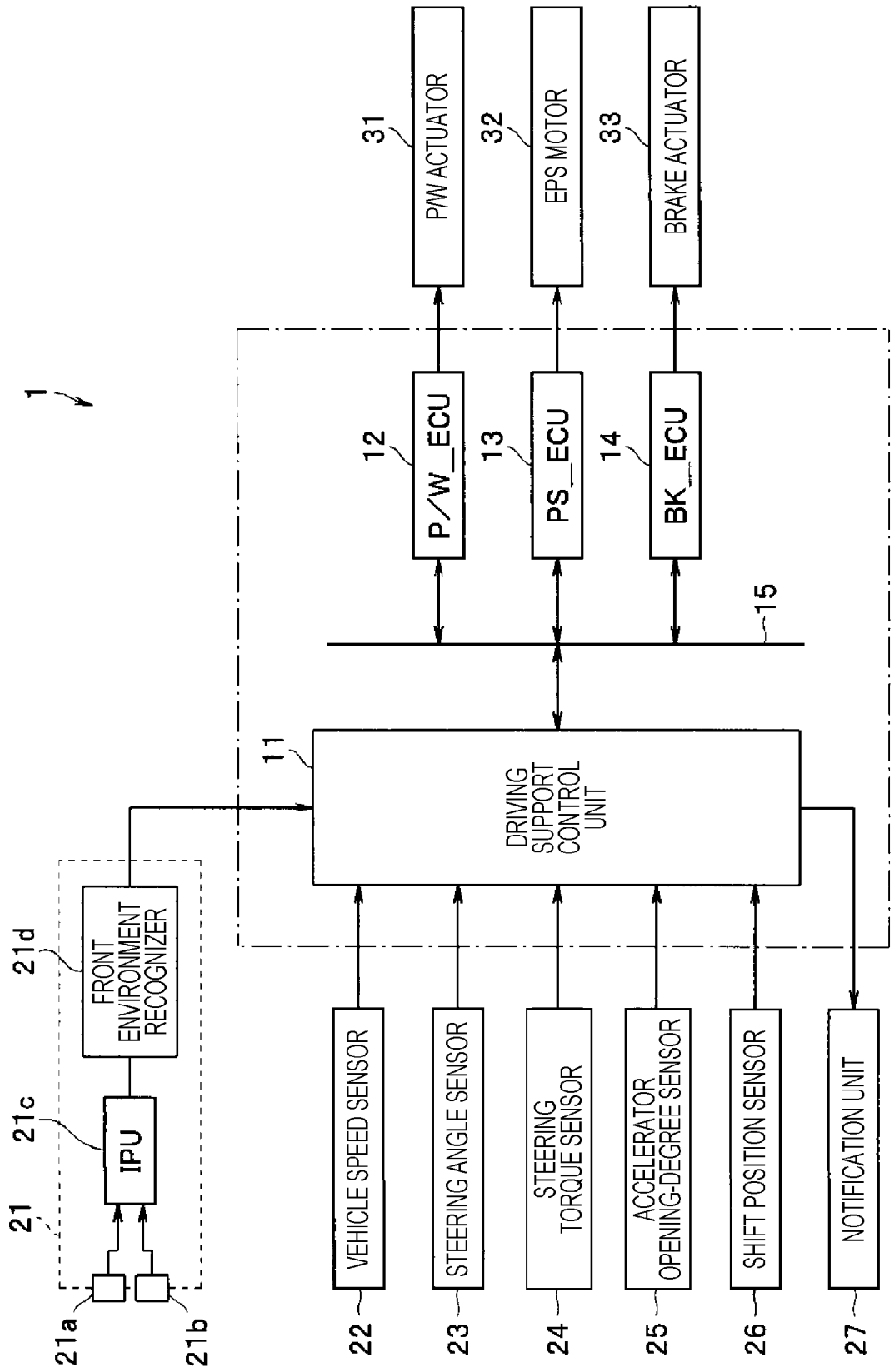
FIG. 1 schematically illustrates the configuration of a driving support device.

The vehicle M is equipped with a driving support device 1 illustrated in FIG. 1. The driving support device 1 includes control units, such as a driving support control unit 11, a power control unit (referred to as "P/W_ECU" hereinafter) 12, a power steering control unit (referred to as "PS_ECU" hereinafter) 13, and a brake control unit (referred to as "BK_ECU" hereinafter) 14. These control units 11 to 14 are coupled to one another in a bidirectional communicable manner via an in-vehicle communication line 15, such as a controller area network (CAN).

The driving support control unit 11 has an input side coupled to various kinds of sensors, such as a camera unit 21 as a vehicle-exterior environment recognizer, a vehicle speed sensor 22 that detects a vehicle speed V of the vehicle M, a steering angle sensor 23 that detects a steering angle θh of the steering wheel, a steering torque sensor 24 that detects a steering torque applied by the driver, an accelerator opening-degree sensor 25 that detects an amount (i.e., the degree of opening) by which the accelerator pedal is pressed by the driver, and a shift position sensor 26 that detects a shift position according to an operation by the driver, and also has an output side coupled to a notification unit 27 as a notifier.

The camera unit 21 is fixed to an upper central area at the front of the vehicle cabin of the vehicle M and has a vehicle-mounted camera (i.e., stereo camera) constituted of a main camera 21a and a sub camera 21b that are disposed at bilaterally-symmetric locations with respect to the center in the vehicle width direction, an image processing unit (IPU) 21c, and a front environment recognizer 21d. The camera unit 21 uses the main camera 21a to acquire reference image data, and uses the sub camera 21b to acquire comparison image data.

The camera unit 21 causes the IPU 21c to perform predetermined image processing on both of these pieces of image data. The front environment recognizer 21d reads the reference image data and the comparison image data processed by the IPU 21c so as to recognize the same object in the two images based on parallax therebetween, and also calculates distance data (i.e., distance from the vehicle M to the object) by using the triangulation principle so as to recognize front environment (i.e., vehicle-exterior environment) information in a predetermined angular range centered on an axis Z of the vehicle M.

The front environment information includes a road shape (e.g., the left and right boundary lines, the road curvature [1/m] in the middle between the boundary lines, and the width (lane width) between the left and right boundary lines) of a lane (driving lane) on which the vehicle M travels, an exit of, for example, a highway road or a bypass road, a lane width between boundary lines of a branch lane leading to a junction, an intersection, a pedestrian crossing, a traffic light, a road sign, a moving three-dimensional object, such as a vehicle ahead or an oncoming vehicle, a roadside obstacle (such as a power pole, a telephone pole, or a parked vehicle), and a wall of a building.

The P/W_ECU 12 controls an output of a driving source in accordance with, for example, a driving load. The driving source driven and controlled by the P/W_ECU 12 is, for example, an engine, and an output shaft of the driving source is coupled to an automatic transmission, such as a continuously variable transmission (CVT). The P/W_ECU 12 is coupled to a P/W actuator 31 that controls the output of this driving source. The driving source used may be either one of a hybrid driving source equipped with an engine and an electric motor, and a simple driving source, such as an electric motor. If an electric motor is provided as the driving source, the P/W actuator 31 controls both power running and regeneration (i.e., regenerative braking).

The output side of the PS_ECU 13 is coupled to an electric power steering (EPS) motor 32. The EPS motor 32 applies steering torque to a steering mechanism by utilizing a rotational force of the motor. In automated driving, the EPS motor 32 is controlled and actuated in accordance with a drive signal from the PS_ECU 13, so that lane keeping control for making the vehicle M travel along a target traveling path (e.g., the lane center) is executed.

The output side of the BK_ECU 14 is coupled to a brake actuator 33. The brake actuator 33 adjusts braking hydraulic pressure to be supplied to each of braking wheel cylinders provided in the respective wheels. When the brake actuator 33 is driven in accordance with a drive signal from the BK_ECU 14, the braking wheel cylinders generate a braking force against the wheels, thereby forcibly decelerating the vehicle M.

The driving support control unit 11 performs adaptive cruise control (ACC) based on the front environment image information transmitted from the camera unit 21. For example, the driving support control unit 11 checks whether a vehicle ahead is running in front of the vehicle M. If a vehicle ahead is detected, the driving support control unit 11 calculates the distance (referred to as "vehicle-to-vehicle distance" hereinafter) between the vehicle ahead and the vehicle M, as well as the relative vehicle speed. In automated driving, the vehicle M is caused to follow the vehicle ahead based on the vehicle-to-vehicle distance and the relative vehicle speed. On the other hand, if a vehicle ahead is not detected, the driving support control unit 11 causes the vehicle M to run steadily at a set vehicle speed set by the driver. Such ACC is realized by, for example, the P/W_ECU 12 controlling the P/W actuator 31 and the BK_ECU 14 controlling the brake actuator 33 based on a control signal from the driving support control unit 11.

For example, during the ACC, if the driving support control unit 11 detects a predetermined operation performed on the accelerator pedal by the driver based on a signal from the accelerator opening-degree sensor 25, the driving support control unit 11 detects an overriding state and cancels the ACC.

Furthermore, for example, the driving support control unit 11 performs lane keeping control based on the front environment information transmitted from the camera unit 21. In one example, the driving support control unit 11 calculates the lane center based on the left and right boundary lines of the lane on which the vehicle M travels, and causes the vehicle M to travel along the calculated lane center. Such lane keeping control is realized by, for example, the PS_ECU 13 controlling the EPS motor 32 based on a control signal from the driving support control unit 11.

For example, during the lane keeping control, if the driving support control unit 11 detects a predetermined steering operation performed by the driver based on a signal from the steering torque sensor 24, the driving support control unit 11 detects an overriding state and cancels the lane keeping control.

Furthermore, for example, the driving support control unit 11 performs erroneous-start suppression control on the vehicle M based on the front environment information transmitted from the camera unit 21. In one example, when the vehicle M is in a parked state, if there is an obstacle within a set distance zth in front of the vehicle M in the direction of the axis Z and an accelerator operation for starting of the vehicle M to move toward the obstacle is performed, the driving support control unit 11 executes erroneous-start suppression control to prevent the starting of the vehicle M.

On the other hand, while the driving support control unit executes the aforementioned erroneous-start suppression control, if the driver inputs a steering operation that enables avoidance of a collision with the obstacle and operates the accelerator pedal at a set degree of opening or more continuously for a set time period, the driving support control unit 11 detects an overriding state and cancels the erroneous-start suppression control.

In one embodiment, the driving support control unit 11 may serve as an "erroneous-start suppression controller" and an "erroneous-start-suppression-control canceler".

Figure 2:
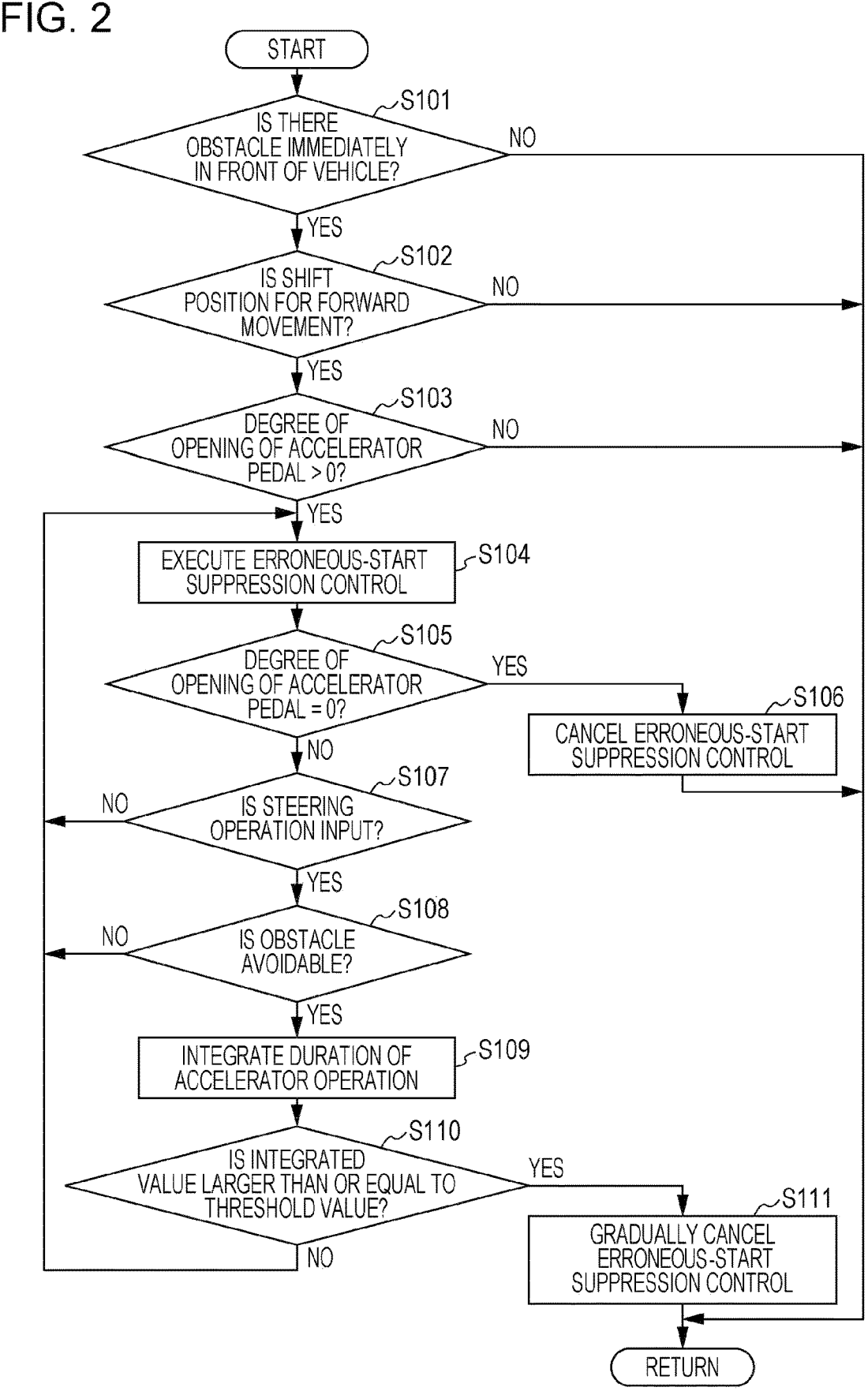
FIG. 2 is a flowchart illustrating an erroneous-start suppression control routine.

Next, the erroneous-start suppression control executed by the driving support control unit 11 will be described in accordance with a flowchart of an erroneous-start suppression control routine illustrated in FIG. 2. This routine is executed repeatedly every set time period.

When the routine starts, the driving support control unit 11 first checks whether there is an obstacle B immediately in front of the vehicle M in step S101. An example of a case where there is an obstacle B immediately in front of the vehicle M is a case where the obstacle B exists in front of the vehicle M in the direction of the central axis Z and a distance z_diff from the vehicle M to the obstacle B is smaller than or equal to a predetermined threshold value zth, as illustrated in FIG. 3.

The threshold value zth in this embodiment is set to, for example, a distance (e.g., 1 to 3 m) at which it is difficult to avoid a collision between the vehicle M and the obstacle even by steering the vehicle M when a surface of the obstacle having a predetermined width or larger faces the vehicle M. However, in FIG. 3, a wall surface of a building is diagonally facing the vehicle M immediately in front thereof at a predetermined angle relative to the central axis Z of the vehicle M. Therefore, in the case illustrated in FIG. 3, if the driver sufficiently steers the vehicle M and then starts to move the vehicle M, contact with the obstacle B can be avoided even when the distance z_diff from the vehicle M to the obstacle B is smaller than or equal to the threshold value zth.

If the driving support control unit 11 determines in step S101 that there is no obstacle B immediately in front of the vehicle M, the driving support control unit 11 exits the routine.

In contrast, if the driving support control unit 11 determines in step S101 that there is an obstacle B immediately in front of the vehicle M, the driving support control unit 11 proceeds to step S102. In step S102, the driving support control unit 11 checks whether the currently-selected shift position is a shift position for forward movement (i.e., any one of the first gear range, the second gear range, the drive range, and so on) based on a signal from the shift position sensor 26.

If the driving support control unit 11 determines in step S102 that the shift position is not a shift position for forward movement, the driving support control unit 11 exits the routine.

In contrast, if the driving support control unit 11 determines in step S102 that the shift position is a shift position for forward movement, the driving support control unit 11 proceeds to step S103. In step S103, the driving support control unit 11 checks whether the accelerator pedal is currently operated by the driver (i.e., whether the degree of opening of the accelerator pedal is greater than "0") based on a signal from the accelerator opening-degree sensor 25.

If the driving support control unit 11 determines in step S103 that the accelerator pedal is not operated by the driver, the driving support control unit 11 exits the routine.

In contrast, if the driving support control unit 11 determines in step S103 that the accelerator pedal is operated by the driver, the driving support control unit 11 proceeds to step S104 to execute erroneous-start suppression control. In one example, the driving support control unit 11 controls the P/W actuator 31 via the P/W_ECU 12, so as to suppress the output from the driving source. Furthermore, the driving support control unit 11 controls the brake actuator 33 via the BK_ECU 14, so as to generate a braking force, where necessary. Moreover, the driving support control unit 11 causes the notification unit 27 to provide a notification indicating that the erroneous-start suppression control is currently being executed against the obstacle B ahead by audio or by display.

When the driving support control unit 11 proceeds from step S104 to step S105, the driving support control unit 11 checks whether the accelerator pedal is currently released by the driver (i.e., whether the degree of opening of the accelerator pedal is "0") based on a signal from the accelerator opening-degree sensor 25.

Then, if the driving support control unit 11 determines in step S105 that the degree of opening of the accelerator pedal is "0" and that the accelerator pedal is released by the driver, the driving support control unit 11 proceeds to step S106 to cancel the erroneous-start suppression control, and then exits the routine.

In contrast, if the driving support control unit 11 determines in step S105 that the degree of opening of the accelerator pedal is greater than "0" and that the accelerator pedal is not released by the driver yet, the driving support control unit 11 proceeds to step S107 to check whether a steering operation is currently input by the driver based on a signal from the steering angle sensor 23.

If the driving support control unit 11 determines in step S107 that a steering operation is not input by the driver, the driving support control unit 11 returns to step S104.

In contrast, if the driving support control unit 11 determines in step S107 that a steering operation is input by the driver, the driving support control unit 11 proceeds to step S108 to check whether contact with the obstacle B is avoidable in accordance with the steering operation by the driver. In one example, the driving support control unit 11 calculates a predicted traveling path (see the two-dot chain line in FIG. 3) of the vehicle M based on a steering angle from the steering angle sensor 23, and checks whether contact with the obstacle B is avoidable if the vehicle M travels along the predicted traveling path.

Then, if the driving support control unit 11 determines in step S108 that contact with the obstacle B is unavoidable, the driving support control unit 11 returns to step S104.

In contrast, if the driving support control unit 11 determines in step S108 that contact with the obstacle B is avoidable, the driving support control unit 11 proceeds to step S109 to integrate the duration of the accelerator operation. In detail, for example, the driving support control unit 11 integrates the duration when the degree of opening of the accelerator pedal is greater than or equal to a set degree of opening (e.g., 80% or greater).

When the driving support control unit 11 proceeds from step S108 to step S110, the driving support control unit 11 checks whether the integrated value of the duration of the accelerator operation is larger than or equal to a predetermined threshold value (e.g., 3 to 4 seconds).

Then, if the driving support control unit 11 determines in step S110 that the integrated value of the duration of the accelerator operation is smaller than the threshold value, the driving support control unit 11 returns to step S104.

In contrast, if the driving support control unit 11 determines in step S110 that the integrated value of the duration of the accelerator operation is larger than or equal to the threshold value, the driving support control unit 11 proceeds to step S111 to gradually cancel the erroneous-start suppression control, and subsequently exits the routine. In one example, the driving support control unit 11 controls the P/W actuator 31 via the P/W_ECU 12, so as to gradually increase the output from the driving source to an output corresponding to the degree of opening of the accelerator pedal. Furthermore, the driving support control unit 11 controls the brake actuator 33 via the BK_ECU 14, so as to gradually release the braking force.

According to this embodiment, when there is an obstacle B within a set distance in the direction of the axis Z of the vehicle M and an accelerator operation that causes the vehicle M to start moving toward the obstacle B is performed, erroneous-start suppression control is executed. When a steering operation that enables avoidance of the obstacle B is input and the accelerator pedal is continuously operated at a set degree of opening or greater for a set time period during the erroneous-start suppression control, the erroneous-start suppression control is canceled so that, even when a collision with the obstacle B is avoidable, the vehicle M can be started while allowing the driver to recognize the situation.

That is, when there is an obstacle B within a set distance in the direction of the axis Z of the vehicle M and an accelerator operation that causes the vehicle M to start moving toward the obstacle B is performed, erroneous-start suppression control is executed, so that the driver is reliably made to recognize the possibility of an erroneous operation for starting the vehicle M. In addition, when a steering operation that enables avoidance of the obstacle B is input by the driver and the accelerator pedal is continuously operated at a set degree of opening or greater for a set time period during the erroneous-start suppression control, the erroneous-start suppression control is canceled. Thus, while the driver is made to sufficiently recognize the possibility of an erroneous vehicle-starting operation, the vehicle M can be started while respecting the driver's intention.

In this case, the vehicle speed is gradually increased after the erroneous-start suppression control is canceled, so that the driver can take over the subsequent driving operation without panicking.

Furthermore, during the erroneous-start suppression control, the notification unit 27 notifies the driver that the erroneous-start suppression control is being performed, so that the driver can appropriately recognize that the driver may possibly be performing an erroneous vehicle-starting operation.

In the above embodiment, each of the units 11 to 14 and the front environment recognizer 21d is constituted of a known microcomputer equipped with a central processing unit (CPU), a random access memory (RAM), a read-only memory (ROM), and a nonvolatile storage unit, and peripheral devices thereof. The ROM has preliminarily stored therein, for example, a program to be executed by the CPU, as well as fixed data, such as a data table. The functions of the processor may entirely or partially be constituted of either one of a logic circuit and an analog circuit, and the process of each of the various kinds of programs may be realized by an electronic circuit, such as a field programmable gate array (FPGA).

The above embodiment of the disclosure is not limited thereto and permits other various modifications so long as they do not depart from the scope of the disclosure in the practical phase.

For example, the erroneous-start suppression control described above may be performed not only when the vehicle M is in a parked state, but also when, for example, the vehicle M is running at a predetermined low speed.

Furthermore, for example, if a camera unit that recognizes the environment behind the vehicle M is provided, the above embodiment is also applicable to erroneous-start suppression control for preventing the vehicle M from start moving rearward erroneously.

Moreover, the vehicle-exterior environment recognizer is not limited to a camera unit and may be either one of a monocular camera and a millimeter-wave radar.

In a case where the aforementioned problem can be solved and the aforementioned advantages can be achieved even when some components are eliminated from all the components indicated in the embodiment, the configuration without these eliminated components is extractable as an embodiment of the disclosure.

With the driving support device for a vehicle according to the embodiment of disclosure, if there is an obstacle within a set distance in the axial direction of the vehicle, the vehicle can be started while allowing the driver to appropriately recognize the situation even when a collision with the obstacle is avoidable.

The driving support device 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving support device 1 including the driving support control unit 11, the P/W_ECU 12, the PS_ECU 13, and the BK_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving support device for a vehicle, the driving support device comprising:
   a vehicle-exterior environment recognizer configured to recognize exterior environment of the vehicle;
   an erroneous-start suppression controller configured to execute erroneous-start suppression control that suppresses an output of a driving source of the vehicle, when an obstacle is present within a set distance in an axial direction of the vehicle and an accelerator operation for starting of the vehicle to move toward the obstacle is performed by a driver of the vehicle; and
   an erroneous-start-suppression-control canceler configured to cancel the erroneous-start suppression control when a steering operation that is to enable avoidance of the obstacle is input and the accelerator operation is continuously performed at a set degree of opening of an accelerator or greater for a set time period during the erroneous-start suppression control.

2. The driving support device according to claim 1, wherein the erroneous-start-suppression-control canceler is configured to gradually increase a speed of the vehicle after canceling the erroneous-start suppression control.

3. The driving support device according to claim 1, further comprising:
a notifier configured to notify, during the erroneous-start suppression control, a driver of the vehicle that the erroneous-start suppression control is being executed.

4. The driving support device according to claim 2, further comprising:
a notifier configured to notify, during the erroneous-start suppression control, a driver of the vehicle that the erroneous-start suppression control is being executed.

5. A driving support device for a vehicle, the driving support device comprising:
circuitry configured to
recognize environment of the vehicle,
execute erroneous-start suppression control that suppresses an output of a driving source of the vehicle, when an obstacle is present within a set distance in an axial direction of the vehicle and an accelerator operation for starting of the vehicle to move toward the obstacle is performed by a driver of the vehicle, and
cancel the erroneous-start suppression control when a steering operation that is to enable avoidance of the obstacle is input and the accelerator operation is continuously performed at a set degree of opening of an accelerator or greater for a set time period during the erroneous-start suppression control.

* * * * *